(12) United States Patent
Ackerman et al.

(10) Patent No.: US 6,447,690 B1
(45) Date of Patent: Sep. 10, 2002

(54) METHODS FOR FABRICATING STEPPED ETALONS

(75) Inventors: David Alan Ackerman, Hopewell; Lynn Frances Schneemeyer, Westfield, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/708,202

(22) Filed: Nov. 8, 2000

(51) Int. Cl.$^7$ ............................................. C03C 15/00
(52) U.S. Cl. ........................................... 216/24; 216/67
(58) Field of Search ............................... 216/24, 41, 67, 216/72, 75, 77, 79

(56) References Cited

U.S. PATENT DOCUMENTS

| | | | | |
|---|---|---|---|---|
| 5,013,141 A | * | 5/1991 | Sakata | 349/201 |
| 6,243,517 B1 | * | 6/2001 | Deacon | 372/102 |
| 6,246,480 B1 | * | 6/2001 | O'Brien | 356/454 |
| 6,323,987 B1 | * | 11/2001 | Rinaudo et al. | 250/201.9 |

\* cited by examiner

Primary Examiner—Randy Gulakowski
Assistant Examiner—Allan Olsen
(74) Attorney, Agent, or Firm—Peter V. D. Wilde; Thomas, Kayden, Horstemeyer & Risley LLP

(57) ABSTRACT

The specification describes stepped etalon structures and techniques for their fabrication. The preferred etalon material is $LiCaAlF_6$, which is not efficiently processed using reactive ion etching. The approach of the invention is to produce the steps on the etalon by depositing a blanket layer of step material that is effectively etched by RIE, masking a portion of the step material, and etching the masked blanket layer using the $LiCaAlF_6$ substrate as an etch stop. These process steps may be repeated to form multiple steps on the etalon. Etalon structures with steps on both major surfaces are described, as well as etalon structures with steps having differing areas. In the latter case a difference in amplitude in the output signal from a single detector can be used to identify the step that is resonating.

8 Claims, 4 Drawing Sheets

METHODS FOR FABRICATING STEPPED ETALONS

FIELD OF THE INVENTION

This invention relates to stepped etalon devices and their manufacture.

BACKGROUND OF THE INVENTION

Etalon devices are used widely in optical systems for optical wavelength measurement and control. They are simple interferometer devices that are structurally tuned to a given wavelength of interest. As such they are highly sensitive to temperature variations that expand or contract the etalon itself and change the refractive index. They are also highly sensitive to optical position, i.e. alignment. Both of these potential errors can be compensated for by using a stepped etalon device. The stepped etalon is actually a series of etalons with resonant wavelengths closely spaced to one another. Each of the etalons in the series is provided with an optical detector. The relative intensity of the detector outputs reflects any change in the principle optical wavelength.

These devices can be used to monitor and control, using electrical feedback, the output wavelength of an optical generator, typically a laser. They are used in a variety of applications for precise wavelength control, such as for channel stabilization in wavelength division multiplexed (WDM) systems.

The structure of a stepped etalon is relatively simple. In the basic embodiment it consists of an optically transparent body with one planar surface and one stepped surface. In principle, an equivalent function can be realized with discrete etalon devices, but integrating them as a single body allows for a common reference surface, and simplifies the system.

An etalon device can be made from any transparent material with reflective boundaries that create an optical resonant cavity. However, commonly used optical quality materials, e.g. fused quartz, have temperature coefficients of expansion (TCE) that are unacceptably large, making the control element also vulnerable to thermally induced drift. Etalon devices are also susceptible to thermo-optic effects, i.e. change in refractive index with temperature. New materials have been developed in which the thermo-mechanical material properties are matched with the thermo-optic properties so that, over a suitable temperature range, the thermo-mechanically induced drift in wavelength is compensated for by the thermo-optic wavelength shift. These materials are described and claimed in my co-pending patent application Serial No.(Ackerman et al. Case 24-11-22-35-2-7-15), filed Mar. 15, 2000. Among the materials that provide nearly offsetting thermo-optic and thermo-mechanical properties are AgCl, LiIO$_3$, CaCO$_3$, CaWO$_4$ and LiCaAlF$_6$. From the standpoint of stability, performance, and manufacturability, LiCaAlF$_6$ is presently the preferred choice.

The technique used to fabricate a stepped etalon begins with a body of optical quality material and precisely parallel sides. One side is provided with a series of steps by sequentially masking that side and etching by, e.g., reactive ion etching. Although the steps themselves are relatively shallow, some of the desirable optical quality materials, notably LiCaAlF$_6$, are difficult to RIE process. Multiple steps in these materials require a long time to process, making these apparently simple devices costlier than desired. The alternative of wet etching lacks the precision desired for these structures.

STATEMENT OF THE INVENTION

We have developed a new thin film processing approach for the fabrication of stepped etalon devices. The process begins with an optical quality temperature compensated material, preferably LiCaAlF$_6$, with two parallel opposing surfaces. To fabricate the steps, a multi-step process of deposition and selective RIE is used. The material deposited to form the steps is chosen for its adhesion and processing characteristics, with the optical properties acceptable but secondary. This option follows from the recognition that the manufacturing properties of the step layer can be allowed to dominate the optical properties because the layer, while thick enough to function in the stepped etalon, is still thin enough to be relatively inconsequential to the overall optical performance of the device. Steps can be formed on both surfaces of the etalon for expanded functionality.

DETAILED DESCRIPTION

Figure 1:
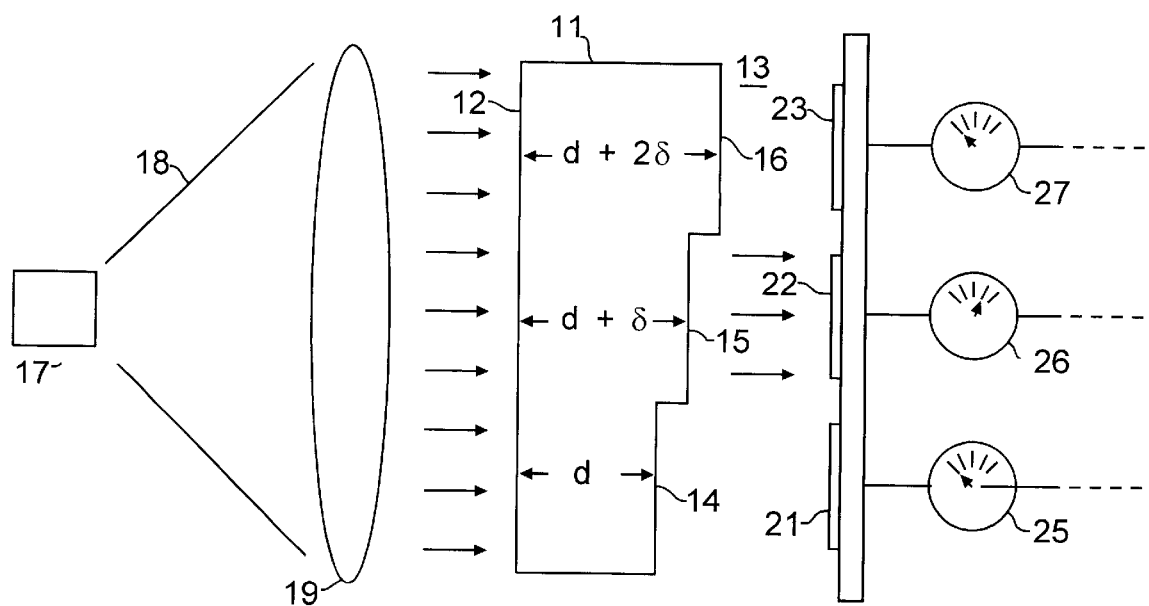
FIG. 1 is a schematic representation of a stepped etalon.

FIG. 1 shows a stepped etalon 11 having one planar surface 12 and a stepped surface 13. The stepped surface in this embodiment is shown with three steps, 14, 15, and 16. (This can also be viewed as a substrate with two steps, but for consistency in this description the substrate level is itself designated a step.) The light source being controlled is laser 17 with output beam 18 focused by collimating lens 19 onto the planar surface 12 of the etalon. The nominal or target laser wavelength, i.e. referred to here as the center wavelength, corresponds to resonator section 15, with distance "d+δ" separating the etalon boundaries in this section. Resonator 14 has cavity distance "d" and will resonate if the wavelength of source 17 drifts lower. Step 16 defines a cavity indicated in the figure by "d+2δ" which has a cavity length that resonates when the laser output drifts to a longer wavelength. The light from each of the resonator sections is measured by photodiodes 21, 22, and 23. Meters 25, 26 and 27 are schematic representations of the output from the photodiodes. As shown, the resonator for the middle section, with distance "d+δ" defined by step 15, and which detects the center wavelength, is active, indicating that the laser is in proper adjustment. The photodiodes 21, 22 and 23 are shown formed on a common substrate. These devices are typically thin film photodiodes and are preferably integrated on a common substrate for low cost and convenience, and especially for ease in alignment of the system. The output from sensors 25, 26, and 27 is fed back to control means (not shown) for adjusting the wavelength of laser 17.

It will be evident to those skilled in the art that the etalon 11 in FIG. 1 can be reversed so that the input beam is incident on the stepped surface.

It will also be understood by those skilled in the art that in the arrangement of FIG. 1 the photodiode for the center wavelength is not essential. It is shown to demonstrate the operating principles of the stepped etalon.

While three steps constituting three resonant cavities are shown in the stepped etalon of FIG. 1, only two are required. This may also be viewed as a substrate with a single step. In either case two resonant cavities are produced. One of the cavities is designed to resonate at the center wavelength. The other cavity is designed to resonate at a slightly different wavelength, either higher or lower than the center. The resonator for the center wavelength determines when drift away from this wavelength occurs, because light from this resonator diminishes. The direction of the drift is sensed by the other resonator. If the second resonator is designed for a longer wavelength, it will resonate when the laser output drifts to a longer wavelength. If the center wavelength detector is extinguished, and no signal is obtained from the second (longer wavelength) detector, then drift to a shorter wavelength can be assumed. While two resonant cavities are an acceptable minimum, in practice three or more cavities are typically used.

Figure 2:
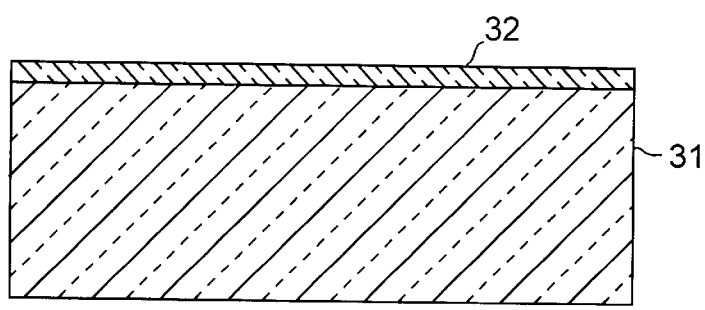
FIGS. 2–8 are schematic diagrams representing process steps for the fabrication of a stepped etalon according to the invention.

A process for fabricating the stepped etalon of FIG. 1 will be described in conjunction with FIGS. 2–8. Referring to FIG. 2, LiCaAlF$_6$ substrate 31 is shown with a first step layer 32 blanket deposited on the substrate. The step layer 32 is preferably SiO$_2$ but may be other suitable materials with refractive index close to that of the substrate such as Si$_3$N$_4$, Al$_2$O$_x$. The step layer material is essentially transparent to light used in optical communication systems, i.e. typically between 1.2 and 1.7 microns. However, while the optical properties of the LiCaAlF$_6$ substrate are important from the standpoint of thermo-optic and thermo-mechanical properties, the optical properties of the step layer are not. This follows the recognition, important to the conception and realization of the invention, that 99+% of the optical properties of the etalon are dictated by the compensated LiCaAlF$_6$ material.

The thickness of the first step layer 32 may vary substantially depending on the design and sensitivity of the system. Typically it will be in the range 0.1–3.0 microns. The design thickness can be calculated from:

$$\Delta d = \lambda/2r\eta$$

where $\Delta d$ is the step size, $\lambda$ is the center wavelength, r can be the number of steps (or other design parameter) and $\eta$ the refractive index.

Layer 32 may be deposited by sputtering, chemical vapor deposition (CVD), plasma assisted CVD (PE-CVD), or other suitable thin film deposition technique. If the layer is SiO$_2$ it is preferably deposited by CVD.

Figure 3:
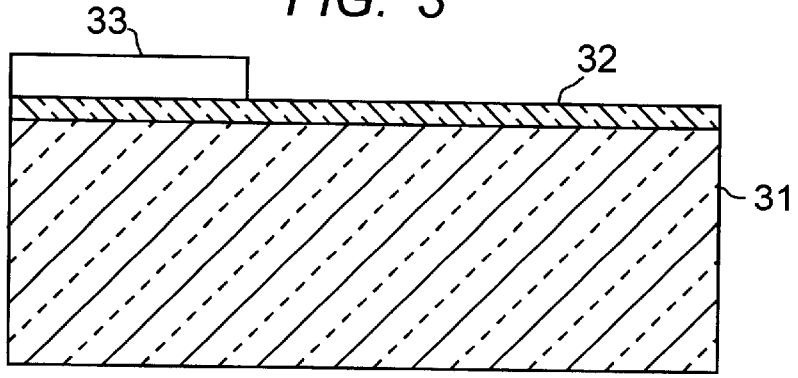
Figure 4:
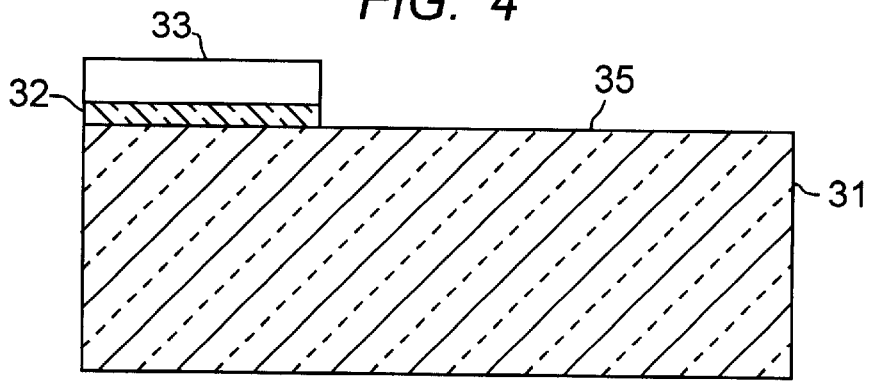

With reference to FIG. 3, an etch resist layer is applied to the surface of layer 32 and patterned as shown to produce mask 33 which exposes a portion of layer 32. In this embodiment, three steps are being formed so the mask 33 covers approximately one third of layer 32. The exposed portion of layer 32 is removed by reactive ion etching (RIE), as shown in FIG. 4. The RIE etch preferably uses halide plasma such as a fluoride plasma.

Reactive ion etching is a widely used technique for anisotropically etching materials; in particular it is widely employed in silicon processing. An etchant species, often a halide ion, F$^-$ or Cl$^-$, is formed by electron impact dissociation of a discharge feed gas. Relatively high etch rates, 500 to 5000 angstroms/min are typical, is an important advantage of the RIE process. Materials etch through the formation of a volatile surface species which results from the reaction of surface atoms and etchant species.

While at least some silicon or aluminum halides are volatile and leave the surface allowing the etching reaction to proceed, volatile species containing lithium or calcium (or other alkaline earth ions) are difficult to create. Because the nonvolatile species build up on the surface, etch rates are low, <40 angstroms/min in the case of LiCaF$_6$ under the conditions we have examined. In such cases, etching proceeds only as a result of ion bombardment rather than by a conventional RIE process.

In this RIE operation, the advantage of the inventive process is evident. The surface portion 35 of the LiCaAlF$_6$ substrate 31 is extremely resistant to RIE. Therefore the substrate surface 35 performs a very reliable etch stop function. Other substrate materials, having RIE etch rates of less than 200 Angstroms/min. may be used.

To build multiple steps, the processing continues.

Figure 5:
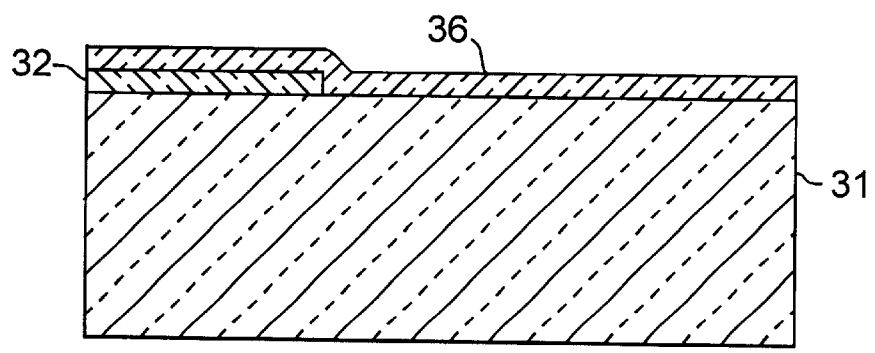
Figure 6:
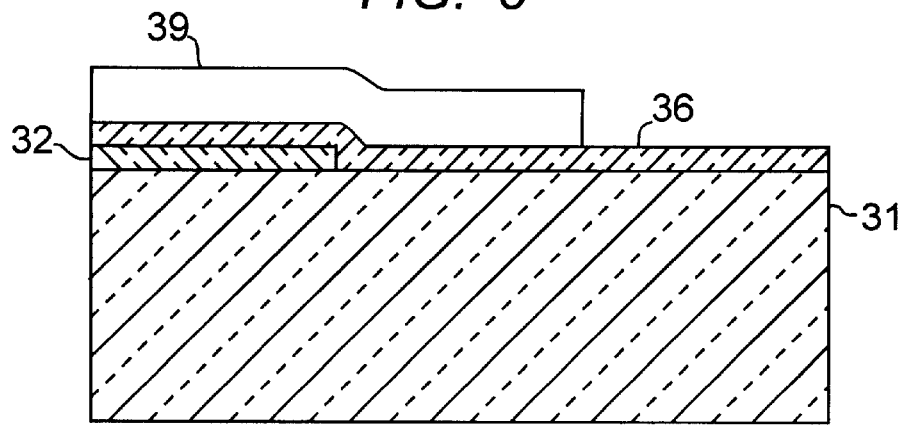
Figure 7:
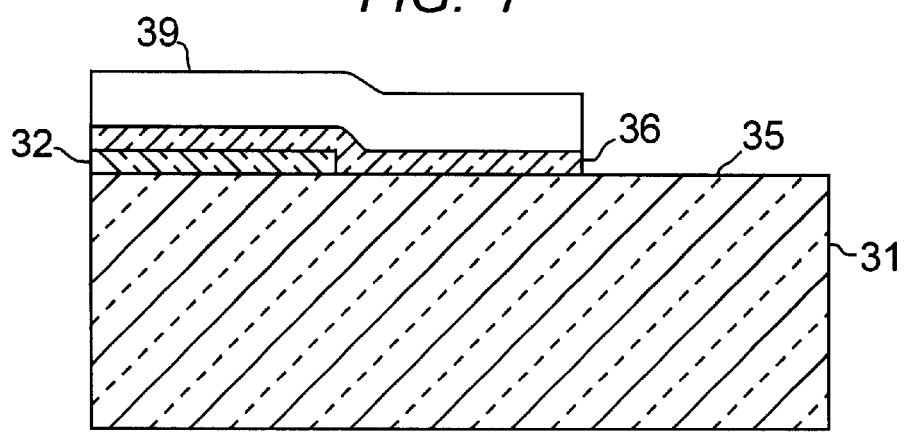
Figure 8:
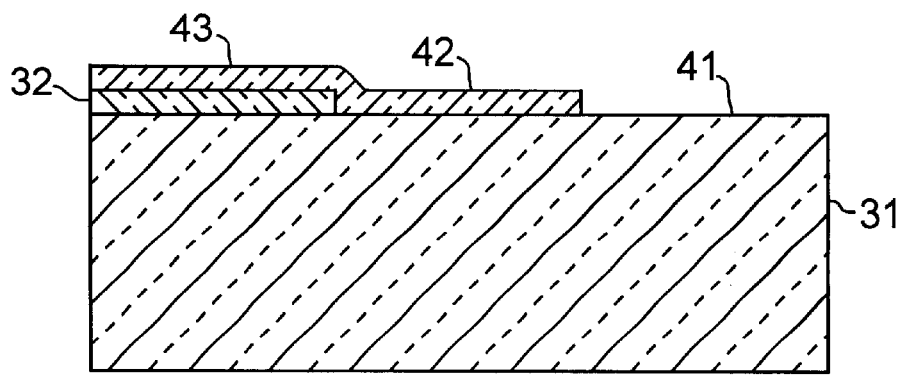

Referring to FIG. 5, a second step layer 36 is blanket deposited on the RIE etched substrate of FIG. 4. This blanket layer will be similar to the first patterned layer 32. Next, layer 36 is masked with mask 39 which, as shown in FIG. 6, is patterned to cover the portion of blanket layer 36 that overlies patterned layer 32, and approximately half of the remaining blanket layer 36. The exposed portions of layer 36 are then removed using RIE. Once again, the surface portion 35 of LiCaAlF$_6$ substrate 31 acts as the etch stop. The resulting structure is shown in FIG. 7. When mask 39 is removed, the final three step etalon structure, with steps 41, 42 and 43, is complete.

As is evident, in the foregoing process sequence, control of each etch step is achieved using the etch resistant properties of the LiCaAlF$_6$ substrate. It will also be noted that no etch step requires removal of more than one thickness of step material. Other sequences can be devised, e.g. producing a multi-layer stack, and using a timed etch control to stop the etch where desired. This approach uses the same number of masks (two), but lacks etch control. It also requires etching through thicker material than in the sequence above.

The process sequence just described can be used to form any number of steps. The advantages of the process sequence become more evident as the number of steps increases.

Figure 9:
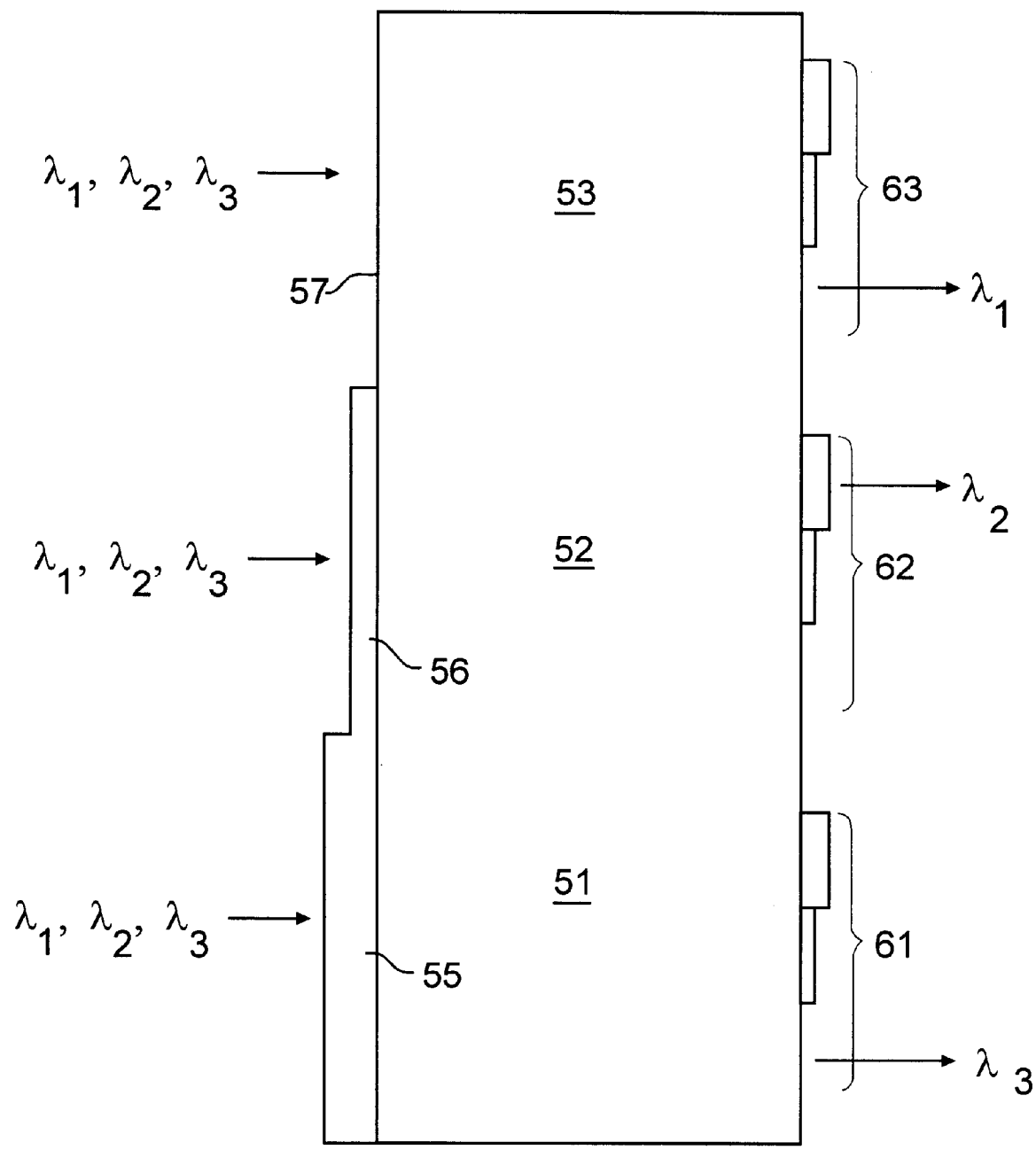
FIG. 9 is a view of a stepped etalon with multiple step sections for a multi-wavelength detector.

A similar approach as that described above can be used to form separate etalon sections on a common substrate. This structure is useful in a demultiplexer where a multi-wavelength beam, of the kind used in wavelength division multiplexers (WDM), is being filtered into separate channel signals. A device using this approach is shown in FIG. 9, and consists of three sections, 51, 52 and 53. Steps 55 and 56 are formed, using the process just described, on surface 57 of the etalon. The input multi-wavelength beam, which in this embodiment has three wavelengths $\lambda_1$, $\lambda_2$, and $\lambda_3$, is directed on the stepped section on the left side of the etalon as shown. The input beam may be a single large apertured mixed wavelength beam, or may be split if desired. The steps 55 and 56, in combination with the stepped sections 61, 62 and 63, separate the input beam into the three channel wavelength components as shown. This device is effective even if the channel wavelengths have drifted off the center wavelength. This is indicated by the output arrows that show resonances at different steps on each section of the etalon.

A similar integrated device is also useful as a compact control element to monitor and adjust three initially separate laser beams, e.g. nominally single channel WDM beams. In this case the input beam for section 51 will have nominal wavelength $\lambda_3$, the input beam for section 52 will have nominal wavelength $\lambda_2$ and the input beam for section 53 will have nominal wavelength $\lambda_1$ The center wavelength for each channel is controlled by the series of steps 61, 62 and 63 on the right side of the etalon as shown in FIG. 9. The control of each channel center wavelength is performed in the manner described above.

As will be evident to those skilled in the art, the size of the elements in these drawings is not to scale. The steps 55 and 56 will be larger than the steps in the groups 61, 62 and 63, because of the larger wavelength separation.

The advantage of this fully integrated device is that it is compact and cost effective. It can be made to control many WDM channel sources. It can also be used, as applications arise, to monitor signals that are already multiplexed. In that case, the multiplexed signal is demulitplexed as described above and the individual channel wavelengths are directed into another integrated etalon for fine wavelength adjustment. The second etalon in the series may be the device of FIG. 9, without steps 55,56.

As is well known in the art, the surfaces forming the etalon and steps in the devices described above are coated with reflecting materials, such as silver or aluminum, to create the resonant cavities. The surfaces are typically >5% reflective.

The term transparent body or transparent substrate as used herein is intended to mean that the body or substrate is at least 80% transparent to one or more wavelengths in the region 1.2–1.7 microns.

The individual processing steps described herein are conventional and do not require specific exposition here in order to practice the invention. For example, methods for depositing and RIE etching the step layers, etc., are not part of the invention but are specified as general operations to give context for the overall process of the invention.

The preferred material for forming the main body of the etalon according to the invention is $LiCaAlF_6$. However, other compensated materials can be substituted. A "compensated" material for the purposes of this invention can be specified for the wavelength range 1.2–1.7 microns, and the temperature range 10° C., as having a Figure of Merit: $FOM<5e^{-6}/K$ where $$FOM \equiv \frac{1}{L}\frac{dL}{dT} + \frac{1}{n}\frac{dn}{dT}$$

where L is the optical path length, n is the refractive index and T is temperature.

The material forming the steps, as mentioned earlier, may be $SiO_2$, which is conveniently deposited by CVD. Other oxides, such as $Al_2O_3$, $TiO_2$ or $Ta_2O_5$, or mixed oxides with compositions tailored for desired thermo-optic and thermo-mechanical properties, can be deposited by RF sputtering. As indicated earlier, the step material should be compatible with standard RIE processes.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. A process for making a stepped etalon comprising the steps of:
   (a) depositing a first step layer on a first surface of a transparent substrate, the transparent substrate having a figure of merit $F_o<5e-6$ over the wavelength range 1500–1600 nm and the temperature range 10° C. to 30° C., and the first step layer and the transparent substrate comprising different materials,
   (b) masking a first portion of the first step layer leaving an exposed portion of the step layer,
   (c) etching the exposed portion of the first step layer by an RIE process at a rate of greater than 500 Angstroms per minute leaving a first step, and leaving an exposed portion of the transparent substrate the exposed portion of the transparent substrate etching at a rate of less than 200 Angstroms per minute.

2. The process of claim 1 wherein the substrate has a second surface, with the first and second surfaces parallel, and wherein the second surface is processed by steps comprising:
   (a) depositing a first step layer,
   (b) masking a first portion of the first step layer leaving an exposed portion of the step layer,
   (c) etching the exposed portion of the first step layer by an RIE process at a rate of greater than 500 Angstroms per minute leaving a first step, and leaving an exposed portion of the transparent substrate the exposed portion of the transparent substrate etching at a rate of less than 200 Angstroms per minute.

3. A process for making a stepped etalon comprising the steps of:
   (a) depositing a first step layer on a transparent substrate, the transparent substrate having a figure of merit $F_o<5e-6$ over the wavelength range 1500–1600 nm and the temperature range 10° C. to 30° C., and the first step layer and the transparent substrate comprising different materials,
   (b) masking a first portion of the first step layer leaving an exposed portion of the first step layer,
   (c) etching the exposed portion of the first step layer by an RIE process at a rate of greater than 500 Angstroms per minute leaving a first step, and leaving an exposed portion of the transparent substrate the exposed portion of the transparent substrate etching at a rate of less than 200 Angstron per minute,
   (d) depositing a second step layer on the first step and the exposed portion of the transparent substrate.

4. The method of claim 3 in which the transparent substrate is $LiCaAlF_6$.

5. The method of claim 4 in which the first and second step layers comprise a material selected from the group consisting of $SiO_2$, SiN, $Al_2O_3$, TaN.

6. The method of claim 3 in which the thickness of the first and second step layers is in the range 0.05–3.0 microns.

7. The method of claim 3 wherein step layer is etched by RIE using a halide plasma.

8. A method for controlling an optical device comprising directing an optical beam from the optical device through a stepped etalon, the stepped etalon produced by steps comprising:
   (a) depositing a first step layer on a first surface of a transparent substrate, the transparent substrate having a figure of merit $F_o<5e-6$ over the wavelength range 1500–1600 nm and the temperature range 10° C. to 30° C., and the step layer and the transparent substrate comprising different materials,
   (b) masking a first portion of the first step layer leaving an exposed portion of the step layer,
   (c) etching the exposed portion of the first step layer by an RIE process at a rate of greater than 500 Angstroms per minute leaving a first step, and leaving an exposed portion of the transparent substrate the exposed portion of the transparent substrate etching at a rate of less than 200 Angstroms per minute.

* * * * *